United States Patent Office 2,950,073
Patented Aug. 23, 1960

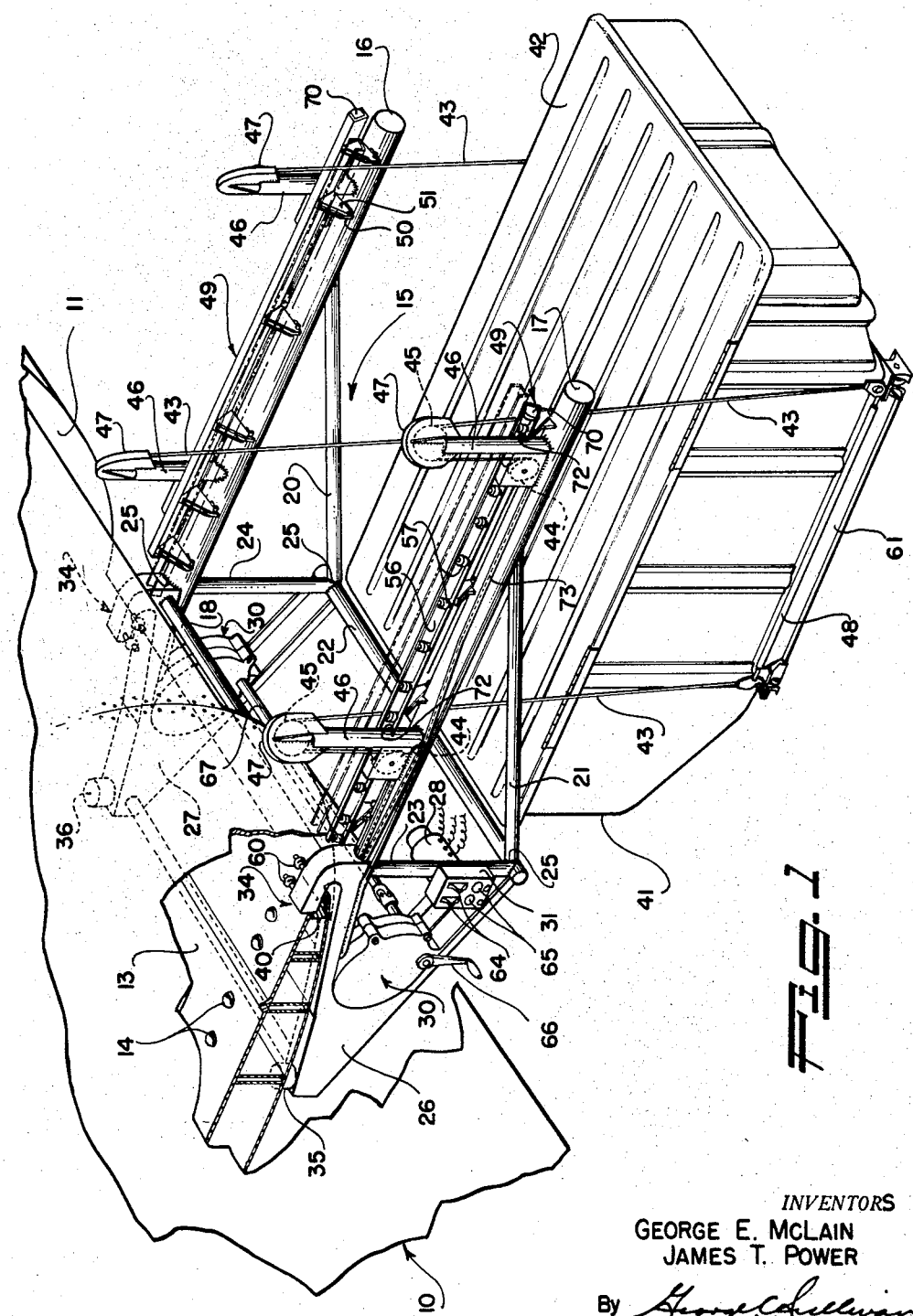
INVENTORS
GEORGE E. MCLAIN
JAMES T. POWER
By *George C. Sullivan*
Agent

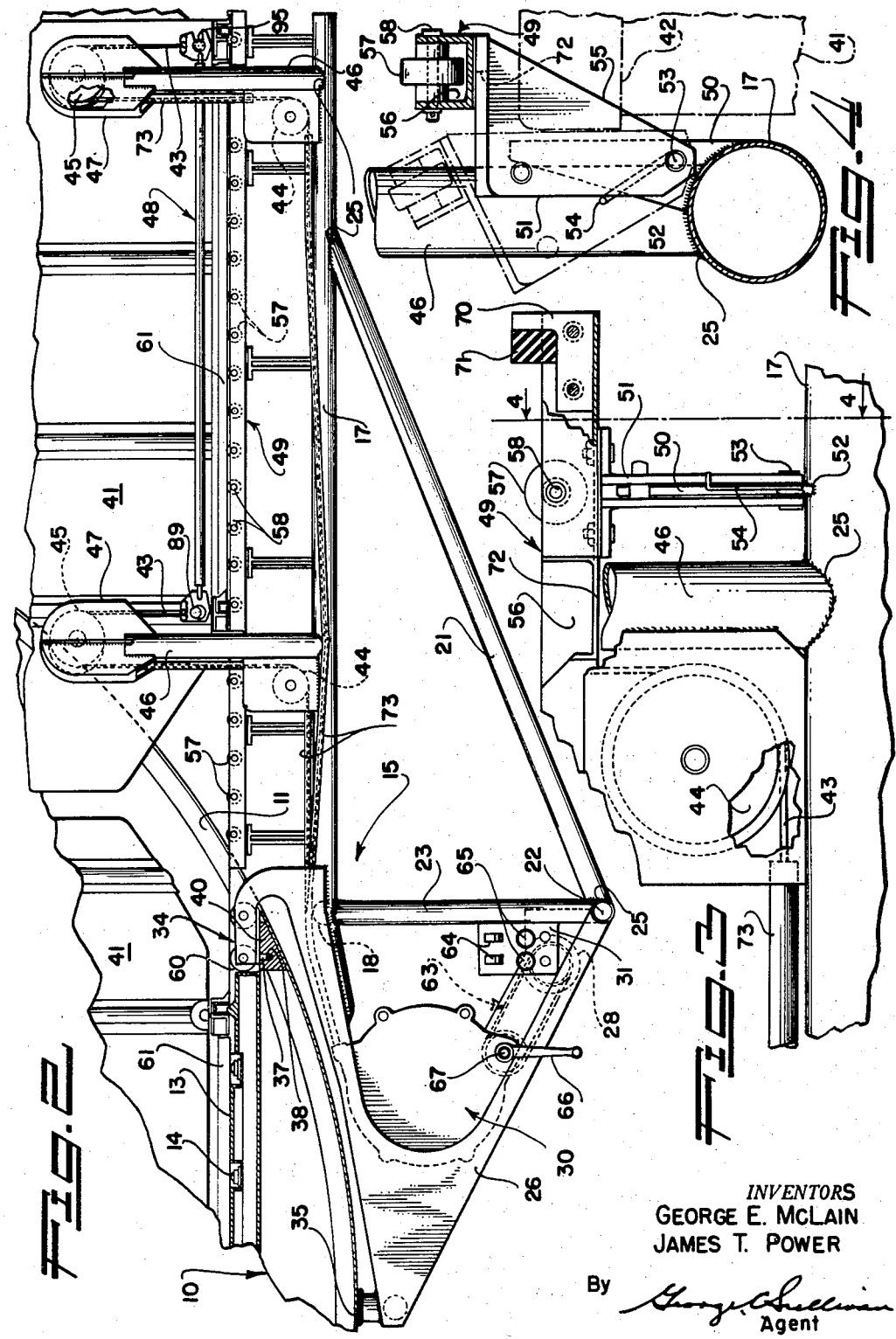

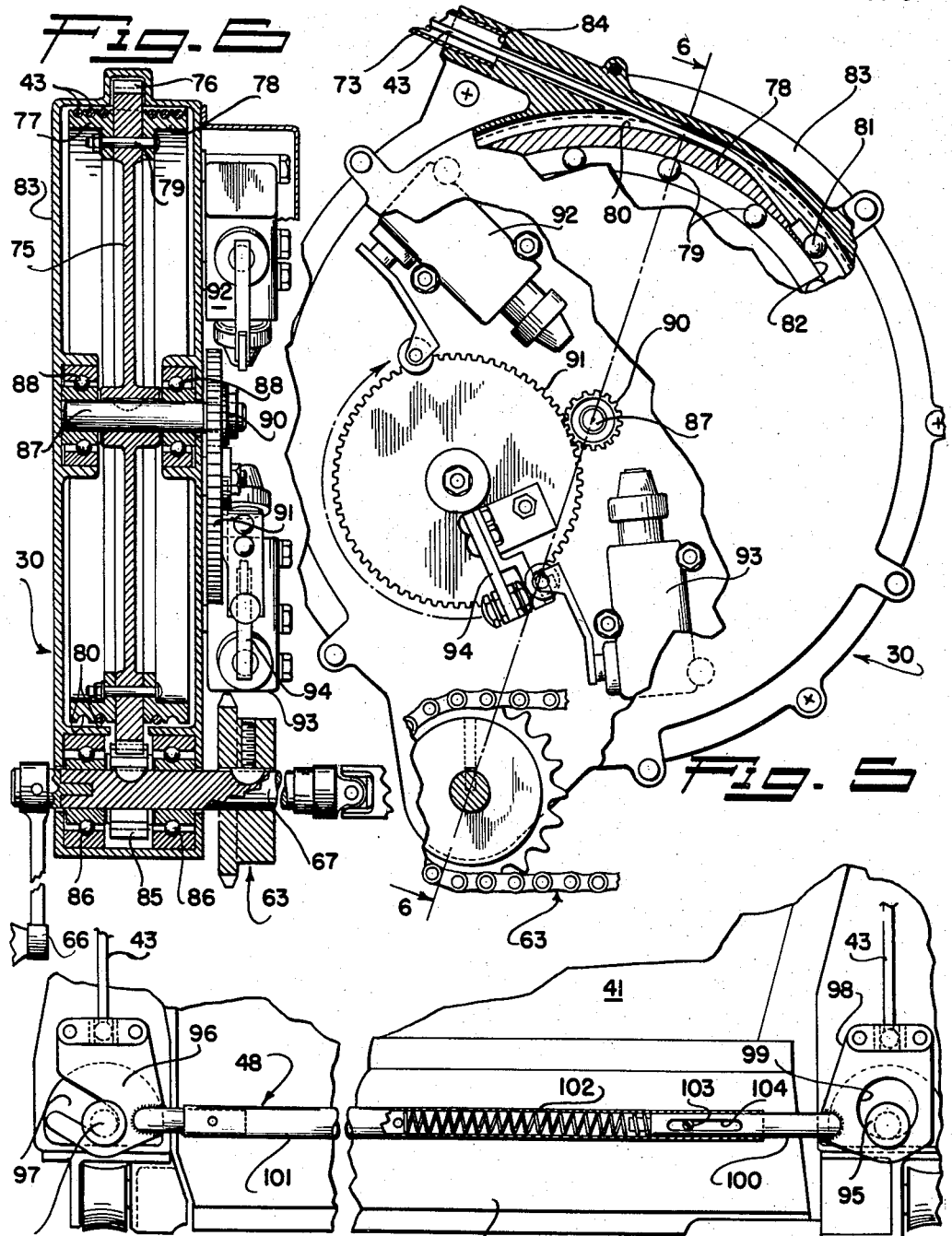

2,950,073

HOIST MECHANISM

George E. McLain, Bakersfield, and James T. Power, Van Nuys, Calif., assignors to Lockheed Aircraft Corporation, Burbank, Calif.

Filed Feb. 18, 1957, Ser. No. 641,434

10 Claims. (Cl. 244—137)

This invention relates to apparatus for handling cargo and baggage and more particularly to an aircraft hoist which is detachable from the aircraft, light in weight, readily traversable for convenient loading and unloading positions and indexed to the cargo floor of the aircraft.

As the size of cargo and passenger aircraft has increased, the height of the cargo or baggage compartments above the ground has steadily increased to a point where it is cumbersome to load and unload cargo or baggage. This increase in height is partly due to the fact that modern tricycle landing gears, as currently employed on aircraft, have raised the fuselage a substantial distance from the ground making it difficult to load heavy cargo and even light weight parcels such as suitcases and the like. Furthermore, the time required to load and unload individual personal baggage by the conventional "bucket brigade" type of operation is quite consuming for commercial airliner operations and has led to the employment of pre-loaded baggage containers which are initially loaded at the airport terminal, transported to the aircraft and mechanically lifted into the stowage compartment. On terminating flights, the containers will be unloaded at the terminal.

Heretofore, it has been the conventional practice to employ apparatus such as large ramps or vehicle mounted hoists to transfer cargo or pre-loaded containers to and from the stowage compartment of an aircraft.

These conventional practices and apparatus are necessarily heavy, cumbersome and expensive. Furthermore, it has been found difficult to align cargo or containers properly with respect to the cargo floor because the hoist is generally indexed to the ground or some other fixed point while the cargo floor is subject to varying degrees of pitch, roll or yaw due to the change of aircraft attitude when fuel, passengers, wind gusts, etc., are encountered.

The present invention provides a compact, efficient hoist mechanism which may be mounted on the aircraft to facilitate loading of cargo and particularly pre-loaded baggage containers. However, the basic features of the invention are adaptable for use for many functions such as a litter lift and may be conveniently provided with a carrier which will receive one or more litters.

The aircraft hoist mechanism of the present invention basically comprises a frame carrying a pair of parallel tracks between which are several power operated lifting cables to which cargo or pre-loaded containers are detachably connected. The cables are operated to raise the cargo or containers to the level of the tracks and are transferred thereto. The frame is secured to and carried by the aircraft in a fashion which references the tracks to the aircraft rather than to the ground or other ground vehicles. This feature insures proper alignment of the container carried on the tracks with the cargo floor or other container receiving apparatus inside the stowage compartment so that transfer of the container from the frame to the aircraft may be achieved regardless of aircraft shifting which might be due to settling of the aircraft or movements responsive to ground wind loads for example.

It is an object of the present invention to provide an aircraft hoist mechanism which may be readily secured to the aircraft during ground loading operations and readily detached therefrom upon completion of loading operations.

An object of the present invention is to provide a novel means for lifting cargo containers and transferring the containers through a cargo port provided in the fuselage of an airplane.

Another object is to provide suitable self-adjusting means carried by the lifting cables which can readily attach and detach to a variety of sizes and shapes of containers or cargo loads.

Another object of the present invention is to provide an aircraft hoist mechanism adaptable to compensate for various changes of aircraft attitudes. This feature is achieved by referencing the hoist mechanism to the aircraft so that movement of the aircraft will be followed by the hoist mechanism.

Still a further object of the present invention incorporates novel means for aligning cargo or pre-loaded containers with the cargo floor or receiving means carried by the aircraft.

Other objects and advantages will be apparent from the following description taken in connection with the accompanying drawings, in which:

Figure 1 is a perspective view of a hoist mechanism in accordance with the present invention supported on the fuselage of an aircraft adjacent a cargo hatch;

Figure 2 is a side view of the hoist mechanism of Figure 1 showing the attachment of the hoist mechanism to the aircraft and the alignment of the cargo floor with the hoist tracks;

Figure 3 is an enlarged view of a portion of the hoist mechanism track showing the support thereof;

Figure 4 is an end view of the track and pivotal support thereof taken in the direction of arrows 4—4 of Figure 3;

Figure 5 is an enlarged side view of the actuating means for the hoist mechanism of Figure 1;

Figure 6 is a sectional view taken in the direction of arrows 6—6 of Figure 5 showing the lifting cables and drum therefor; and Figure 7 is a side view of the latching means employed in the hoist mechanism of Figure 1 to detachably connect a container to the lifting cables.

Referring to the hoist mechanism shown in Figure 1, a portion of an aircraft fuselage 10 is shown having a cargo port 11 provided therein exposing a cargo floor 13 carried interiorly of the fuselage 10. The cargo floor is provided with a plurality of ball bearings 14 adaptable to accommodate the positioning of cargo within the cargo compartment. Upon completion of cargo loading or unloading operators, a door or hatch (not shown) may be employed to cover the cargo port 11.

A basic frame 15 is provided for supporting cargo or baggage bins as they are loaded into the aircraft cargo compartment through port 11 which comprises a pair of cantilever beams 16 and 17 connected together by a rod 18 and supported by a pair of braces 20 and 21 coupled by a connecting rod 22 attached to the pair of beams by a pair of upright supports 23 and 24. Connection between the various beams, braces, rods and supports may be achieved by suitable welding such as weld 25.

A pair of support elements 26 and 27 are connected to the basic frame 10 and serve to mount the basic frame onto the aircraft fuselage 10 adjacent the cargo port 11 and to carry the hoist motor 28, cable storage mechanism 30 and an operational control box 31. Elements 26 and 27 are provided with means 34 for engagement with the cargo floor and means oppositely disposed on each element employing a pair of cushions 35 and 36 engageable with the bottom of the aircraft fuselage. Means 34 of each element include a pin 37, shown more clearly in Figure 2 received into a receptacle 38 provided in a cargo port sill 40.

A cargo bin 41 is shown as one example of a cargo package which may be lifted to the cargo port and positioned within the cargo compartment. In the present instance, cargo bin 41 is provided with a particular configuration adapted to conform with the configuration of the cargo compartment. Upon the loading of cargo, such as baggage, into the bin, a lid 42 may be placed over the bin and secured thereto by suitable means. The cargo bin is supported by the cantilever beams 16 and 17 and by means of a lifting arrangement comprising a plurality of cables such as cable 43 movably associated with the pair of beams over a pulley arrangement employing pulleys 44 and 45 for example. Each pulley is rotatably secured to a member 46 which is attached to the cantilever beams. The cables are guided to the pulleys by means of a guide 47 secured to each member 46 and separated by the pulley wheel 45. One end of each cable is attached to cable storage mechanism 30, to be described later, while its opposite end is attached to a lock bar 48. Obviously, the outboard cables are longer than the cables physically located closest to the fuselage. Two lock bars are provided in the present instance and are detachably connected to the cargo bin on opposite sides thereof.

Carried on each cantilever beam is a U-shaped track means 49 pivotally mounted thereon by a pair of members 50 and 51. Shown more clearly in Figure 4, member 50 is secured to the beam as by weld 52 and member 51 is mounted thereon by a pin 53 so that the track means may be pivoted relative to the beam in order to allow passage of the cargo bin between the pair of beams without interference with the track means. A torsion spring 54 is provided on pin 53 which acts against the members to urge member 51 between the pair of beams to its normal rest position as shown in Figure 1 represented by dotted lines. Member 51 is formed with an angular surface 55 arranged to engage with lid 42 of the cargo bin when the bin is lifted by the lifting arrangement. Upon engagement, the pair of track means pivot outwardly to allow sufficient clearance between the beams for bin passage. Within a hollow portion 56 of the U-shaped track means, there is provided a plurality of rollers 57 arranged in spaced relationship. These rollers are supported on the track means by a pin such as pin 58 shown in Figure 4. When the track means 49 is in its normal position, the rollers of the track means will be in proper alignment with the ball bearings 14 mounted on the cargo floor. A pair of rollers 60 are provided on each element 26 annd 27 adjacent the attachment means 34 carried on each element. It is desirable to maintain the rollers and ball bearings 14 in proper alignment in order to conveniently and easily position the cargo bins thereon. This relationship is shown in Figure 2.

Each bin is provided with a pair of runners 61 attached to the bottom of the bin which ride on the rollers carried by the pair of track means. Upon positioning the bin over the rollers, the runners engage rollers 60 attached to each element and progression of the bin into the cargo compartment engages roller bearings 14 with the runners. Power from motor 28 is transferred to the cable storage mechanism 30 by means of a chain and sprocket drive 63. The operation of this motor is under control of control box 31 having suitable switches 64 and indicating lights 65. In instances where a power failure occurs or the motor 28 is inoperative, a hand crank 66 may be fitted onto a drive shaft 67 and manually operated. Drive shaft 67 connects each cable stowing storage mechanism 30 associated with elements 26 and 27.

As shown in Figure 3, the end of each track means 49 is provided with a stop bracket 70 having a cushion 71 adaptable to prevent a cargo bin from sliding from the track means onto the ground. Furthermore, the track means is provided with a notch 72 adjacent each of the four support members 46 which permits the track means to rotate outwardly as shown in Figure 4. Portions of the cable which are exposed exteriorly of the frame are covered with a protective tubing 73.

With reference to Figures 5 and 6, cable storage arrangement 30 is shown which comprises a main gear 75 having a plurality of teeth 76 and a pair of flanges 77 and 78 attached on opposing sides of the gear's outer periphery by several nut and screw arrangements 79. Each flange, carried by the gear 75, is provided with a plurality of grooves 80 adaptable to receive a separate cable which is stored on each flange. As shown in Figure 5, one end of the cable is provided with a ball 81 which fits into a recessed portion 82 provided in the flange which holds the cable in this position by a turn of the same cable which over rides the ball. The cable and storage mechanism is enclosed within a housing 83 which contains a bore 84 through which the cable enters and leaves the interior of the housing. The main gear 75 of the cable storage mechanism engages with a smaller drive gear 85 attached to main drive shaft 67 for transferring power from the shaft to the main gear. The main drive shaft 67 is mounted on the housing by means of a pair of ball bearings 86. The main gear is rotatably mounted on a shaft 87 carried by the housing and is mounted thereon by a pair of roller bearings 88. It should be noted that a cable storage mechanism 30 is associated with elements 26 and 27 and that these arrangements are identical in structure and operation.

In order to provide a suitable automatic controlling means for determining the upper and lower limits which the cargo bin may travel, a gear 90 is provided on shaft 87 which engages a larger gear 91 rotatably mounted on the outside of the housing. A pair of microswitches 92 and 93 are so positioned about this latter gear on the housing that contact with one of the microswitches by a lever arm 94 carried on gear 91 will occur depending on whether the cables are being withdrawn or advanced from their storage mechanism. These microswitches are electrically connected to the drive motor in order to cut off power to the main drive shaft when either the upper or lower limits have been reached.

With reference to Figure 7, a pair of buttons 89 and 95 are shown attached to each side of a cargo bin. Cables 43 are shown having their ends opposite to the ends connected to the cable storage mechanism suitably attached to a hook 96 having a recess 97 and a plate 98 having an eyelet 99. The plate and hook are resiliently connected by a telescoping rod 100 and tube arrangement 101 having a compression spring 102 within the tube urging the rod outwardly. The tension of the spring is resisted by a pin 103 attached to the rod which projects through an elongated aperture 104 provided in the tube.

In actual operation, the basic frame 15 is attached to the fuselage 10 of the aircraft by inserting pin 37 carried by attachment means 34 into receptacle 38 provided in sill 40 of the cargo port 11. Cushions 35 and 36 are positioned to engage the bottom of the fuselage 10 so that the weight of the basic frame and the cargo being lifted is distributed through the support elements 26 and 27 to the fuselage of the aircraft.

Switch 64 associated with controlling motor 28 is actuated to cause cables 43 to be drawn from cable storage mechanisms 30. As the cables are withdrawn from their associated cable storage mechanisms, lock bar 48 comes into position to be attached to buttons 94 and 95 carried on each side of the cargo bin 41. Attachment of each lock bar to the bin is achieved by initially positioning recess 97 carried by hook 96 over button 94 and by sliding rod 100 within tube arrangement 101 causing eyelet 99 carried by plate 98 to be placed over button 95. Upon release of rod 100, spring 102 urges plate 98 and hook 96 into firm engagement with their respective buttons.

Upon placement of the pair of lock bars onto the buttons carried by the cargo bins, switch 64 associated with controlling motor 28 may be actuated to cables 43 to lift the cargo bin so that the cargo bin is lifted from its supporting structure such as a truck or from the ground. At the moment the cargo bin is free from its support, the cargo bin is referenced directly to the aircraft and variations in height of the aircraft from the ground or in attitude do not affect the cargo bin. As the cargo bin rises in accordance with the activation of motor 28, chain and sprocket arrangement 63 causes the main drive shaft 67 to rotate. The rotation of the main drive shaft causes gear 85 to rotate main gear 75 through the inner connection of teeth 76 with gear 85. The rotation of gear 75 causes cable 43 to be fed onto grooves 80 carried on flanges 77 and 78 respectively through bore 84 of housing 83. Rotation of the main gear 75 on shaft 87 causes gear 91 to rotate via gear 90 carried on the shaft 87. As gear 91 rotates, lever arm 94 strikes microswitch 92. The microswitches are connected to electric motor 28 to start or stop the motor.

The container is transferred from the hoist device to the tracks by initially connecting the cables to the fixtures and fittings on the bottom of the container and activating the cables so that the container is lifted between the tracks and cantilever beams 16 and 17. As the container moves towards the tracks, engagement soon takes place between the top of the container and the members 55 of the track assembly which causes the tracks to pivot outwardly as shown in broken lines in Figure 4. The outward positioning of the tracks provides a sufficient space between cantilever members 16 and 17 and the track assemblies to permit the container to travel vertically past the tracks as the cables are continually actuated. When the container has moved to a vertical position where the bottom of the container is adjacent the top of the tracks, activation of the cables ceases and the tracks automatically pivot inwardly because of the spring loading so that the tracks come to rest beneath the roller assemblies of the container. Next, the cable actuation direction is reversed and the container is lowered until the rollers on the bottom of the container engage on the track rollers whereupon the container becomes fully supported on the track mechanism and the cantilever members 16 and 17. At this time, cargo loading personnel may detach the cables from the fittings on the bottom of the container so that the container is free from all restrictions and the same personnel may then manually push the container over the track assemblies into the cargo compartment of the airplane.

For unloading operations, the immediately described above procedure is reversed whereby the container is manually drawn out of the cargo compartment wherein the rollers on the bottom of the container slide on the rollers provided on the track mechanism until the container is completely separated from the cargo compartment and the airplane. Then the cables are attached to the fixtures on the bottom of the container and the cables are actuated so that the container is lifted from the tracks and the container is supported by the cables. Next, the tracks are manually pivoted and moved out of the way of the container so that the container may be lowered in the space provided between the tracks and members 16 and 17. When the top of the container has passed the tracks, the spring loading of the tracks pivots the tracks assemblies inward into their normal resting position while the cable mechanism lowers the container to the ground and/or awaiting cargo cart. At this time, the weight of the container is released from the cables when its bottom engages the ground or the cart and the cables may be manually removed from the fixtures on the bottom of the cart.

Having described only typical forms of the invention we do not wish to be limited to the specific details herein set forth, but wish to reserve to ourselves any variations or modifications that may appear to those skilled in the art and fall within the scope of the following claims.

We claim:

1. A cargo loading and unloading mechanism for transferring cargo between a cargo supporting surface and a higher floor of an airplane cargo compartment, comprising a support frame detachably mounted on the floor extending outwardly from the cargo compartment, a plurality of lifting means carried by the frame for lifting the cargo in a rectilinear direction with respect to the supporting surface, and track means attached to the frame adaptable to receive the cargo from the lifting means, and primary power means carried on the frame for operating the lifting means.

2. A cargo loading and unloading mechanism for transferring cargo between a cargo supporting surface and a higher floor of an airplane cargo compartment, comprising an elongated support frame pivotally and detachably mounted on the floor extending outwardly from the cargo compartment, means attached to the frame for supporting the frame against the exterior of the the airplane, a plurality of lifting means carried by the frame for lifting the cargo in a rectilinear direction with respect to the supporting surface, track means attached to the frame adaptable to receive the cargo from the lifting means, and primary power means carried on the frame for operating the lifting means.

3. A cargo loading and unloading mechanism for transferring cargo between a cargo supporting surface and a higher floor of an airplane cargo compartment, comprising an elongated support frame pivotally and detachably mounted on the floor extending outwardly from the cargo compartment, support members attached to the frame for bracing the frame against the exterior of the airplane, a plurality of lifting means carried by the frame for lifting the cargo in a vertical plane with respect to the frame, and parallel track means pivotally attached to opposing sides of the frame normally interfering with the cargo being lifted and adaptable to receive the cargo from the lifting means.

4. A cargo loading and unloading mechanism for transferring cargo between a cargo supporting surface and a higher floor of an airplane cargo compartment, comprising an elongated support frame having a pair of parallel members mounted on the floor of the airplane extending outwardly from the cargo compartment, at least a pair of lifting means carried by each parallel member of the frame engageable to the cargo for lifting the cargo in a vertical plane with respect to the frame between the parallel members, and track means pivotally associated with each parallel member of the frame in alignment with the floor of the airplane adaptable to receive the cargo from the lifting means.

5. A cargo loading and unloading mechanism for transferring cargo between a cargo supporting surface and a higher floor of an airplane cargo compartment, comprising an elongated support frame having a pair of parallel members pivotally mounted on the floor of the airplane extending outwardly from the cargo compartment, support means secured to the frame for bracing the frame against the exterior of the airplane, at least a pair of lifting means carried by each parallel member of the frame detachably connected to the cargo for lifting the cargo in a vertical plane with respect to the frame between the parallel members, and track means pivotally associated with each parallel member of the frame in alignment with the floor of the airplane adaptable to receive the cargo from the lifting means.

6. A cargo loading and unloading mechanism for transferring cargo between a cargo supporting surface and a higher floor of an airplane cargo compartment, comprising an elongated support frame having a pair of parallel members pivotally and detachably mounted on the floor of the airplane extending outwardly from the cargo compartment, support means secured to the frame for bracing the frame against the exterior of the airplane, a plurality of lifting means carried by each parallel member of the frame detachably connected to the cargo for lifting the cargo in a vertical plane with respect to the frame between the parallel members, parallel track means pivotally associated with each parallel member of the frame in alignment with the floor of the airplane normally interfering with the cargo being lifted and adaptable to receive the cargo from the lifting means, and primary power means carried on the frame for operating the lifting means.

7. A cargo loading and unloading mechanism for transferring cargo between a cargo supporting surface and a higher floor of an airplane cargo compartment, comprising an elongated support frame having a pair of parallel members mounted on the floor of the airplane extending outwardly from the cargo compartment, a plurality of lifting cables carried by the frame between the parallel members for lifting the cargo in a vertical plane with respect to the frame between the parallel members, and a pair of track means pivotally associated with the pair of members in direct alignment with the floor of the cargo compartment and adaptable to receive the cargo from the lifting cables.

8. A cargo loading and unloading mechanism for transferring cargo between a cargo supporting surface and a higher floor of an airplane cargo compartment, comprising an elongated support frame having a pair of parallel members detachably mounted on the floor of the airplane extending outwardly from the cargo compartment, support means bracing the frame to the exterior of the airplane, a plurality of lifting means pivotally carried by the frame between the parallel members for lifting the cargo in a vertical plane with respect to the frame between the parallel members, mechanism carried by the lifting means for detachably connecting the cargo to the lifting means, and a pair of parallel track means pivotally associated with the parallel members in direct alignment with the floor of the cargo compartment and normally interfering with the cargo being lifted.

9. A cargo loading and unloading mechanism for transferring cargo between a cargo supporting surface and a higher floor of an airplane cargo compartment, comprising an elongated support frame having a pair of parallel members pivotally mounted on the floor of the airplane extending outwardly from the cargo compartment, support members attached to the frame for bracing the frame against the exterior of the airplane, a plurality of lifting means carried by the frame between the parallel members for lifting the cargo in a vertical plane with respect to the frame between the parallel members, mechanism carried by the lifting means for detachably connecting the cargo to the lifting means, and a pair of track means pivotally associated with the pair of members in direct alignment with the floor of the cargo compartment and adaptable to receive the cargo from the lifting means.

10. A cargo loading and unloading mechanism for transferring cargo between a cargo supporting surface and a higher floor of an airplane cargo compartment, comprising an elongated support frame having a pair of parallel members pivotally mounted on the floor of the airplane extending outwardly from the cargo compartment, support members attached to the frame for bracing the frame against the exterior of the airplane, at least two pairs of cables carried by the frame extending between the pair of parallel members for lifting the cargo from the supporting surface in a vertical plane with respect to the frame between the parallel members, mechanism carried by each pair of cables for detachably connecting the cargo to each pair of cables, means responsive to the lengthening and shortening of the cables for limiting the travel of the cargo between an upper and a lower position, a pair of parallel track means pivotally attached to the parallel members, spring tension means secured between each of track means and its respective parallel member urging the track means to normally interfere with the lifting of the cargo by the cables, and each track means having a plurality of rollers in direct alignment with the floor of the cargo compartment adaptable to receive the transfer of cargo from the plurality of cables.

References Cited in the file of this patent

UNITED STATES PATENTS

| | | |
|---|---|---|
| 2,186,854 | Anger et al. | Jan. 9, 1940 |
| 2,462,096 | Hamilton | Feb. 22, 1949 |
| 2,536,080 | Patton | Jan. 2, 1951 |
| 2,621,565 | Laddon et al. | Dec. 16, 1952 |
| 2,635,771 | Black | Apr. 21, 1953 |
| 2,701,068 | Douglas et al. | Feb. 1, 1955 |
| 2,734,645 | Petersen | Feb. 14, 1956 |
| 2,734,705 | Robertson | Feb. 14, 1956 |

OTHER REFERENCES

"Aero Digest," Nov. 15, 1945, pages 77, 121, 122.
"Aviation Week," Mar. 1, 1948, pages 20 and 21.